United States Patent [19]

Bost

[11] Patent Number: 5,720,130
[45] Date of Patent: Feb. 24, 1998

[54] REMOVAL OF SOIL CONTAMINATES

[76] Inventor: Georgia A. Bost, 1209 Pine Chase Dr., Houston, Tex. 77055

[21] Appl. No.: 618,854

[22] Filed: Mar. 20, 1996

[51] Int. Cl.$^6$ .............................. A01C 79/02; C09K 17/00
[52] U.S. Cl. ...................... 47/58; 47/DIG. 10; 210/602; 210/687
[58] Field of Search ............................... 47/58, DIG. 10; 210/602, 687

[56] References Cited

PUBLICATIONS

Cunningham et al. Phytoremediation of contaminated soils. Tibtech. vol. 13 pp. 393–397, 1995.
Klips. Genetic affinity of the rare eastern Texas endemic *Hibiscus dascalyx* (Malvaceae). American Journal of Botany. vol. 82, pp. 1463–1472, 1995.
Salt et al. Phytoremediation: A novel strategy for the removal of toxic metals from the environment using plants. Biotechnology. vol. 13, pp. 468–474, 1995.
Shcnoor et al.Phytoremediation of organic and nutrient contaminants. Environmental Science and Technology. vol. 29. pp. 318–323, 1995.

*Primary Examiner*—Douglas W. Robinson
*Assistant Examiner*—Melissa L. Kimball
*Attorney, Agent, or Firm*—Martin L. McGregor

[57] ABSTRACT

The invention provides a method for reducing soil contamination that comprises: establishing growing plants in the contaminated soil, the plants being selected from the group consisting of Hibiscus species in sections Meunchhusia or Striati or hybrids obtained by a cross with one or more species within sections Meunchhusia or Striati; severing and removing hibiscus plant material from the site. In preferred embodiments, the selected plants are hybrids. Especially preferred plants are selected from the group consisting of *H. coccineus, H. cubensis, H. dasycalyx, H. laevis*, and *H. moscheutos*. Contaminates may include metals, metal salts, nonmetals and organic wastes.

11 Claims, No Drawings

REMOVAL OF SOIL CONTAMINATES

TECHNICAL FIELD

The present invention relates to the removal of contamination from soil. Specifically bioremediation to remove contamination by the cultivation of selected perennial plants which tolerate the contaminate, take it up from the soil, and upon removal of the plant material form the site with the contaminate, reducing soil contamination.

BACKGROUND OF THE INVENTION

Cultivation of plants for food and fiber predates recorded history. However cultivation of plants for remediation of contaminated soils is a relatively new use of plants. Four general categories of wastes that may be treated by selective growing of plants or agroremediation are:

1. Metals-contaminated and/or saline waters (such as irrigation water, or transported waste waters from other locations);

2. Metals-contaminated and/or saline soils, or tertiary treatment ponds amenable to on-site agroremediation;

3. Liquid organic waste and/or waste waters with or without additional metals and/or salinity problems (either onsite or by effluent transport to the agroremediation field), with or without metals contamination; and 4. Organic waste solids (for example, "primaries" from an oily waste spill cleanup using biodegradable absorbents, or from treatment tank solids) or organic waste contaminated soils (e.g., from a burst tank), with or without metals.

Most purely metals contamination problems have been addressed either by leaching (groundwater) or in combination with disposal of the contaminated source soil in hazardous waste landfills.

Oily wastes are more complicated. Most conventional cleanups for oily wastes fall into one of three major categories: Sludges or soils contaminated with refined hazardous materials; oily waste waters; and contamination at "retail" or end user sites.

Oily waste and oily waste-contaminated soils may include petroleum processing sludges, which usually have heavy metal contamination. These wastes may require hazardous waste landfill of residues after organics have been biodegraded. Oily wastes are usually easily composted by standard or resident microbes in conventional treatment approaches. Most do not have high concentrations of very volatile organics.

Petrochemical, pesticides and other refined hazardous materials processing, such as soils contaminated with listed organic chemicals (e.g., organopesticides, known organic carcinogens, PCBs, etc.) are also frequently encountered. Such wastes are conventionally treated with inoculation micro organisms that have been selected for being able to both tolerate and degrade the component contaminates. Many of these wastes have been consigned to incineration as the treatment of choice (many are very volatile), followed by disposal of ash in hazardous waste landfills if metals contamination is also present Contaminated waste waters arise from petroleum processing sources such as oil/water separators with the water fraction going to aeration ponds and treated effluent to tertiary treatment ponds, followed by discharge over baffled 45-degree angle weirs to blow off remaining volatiles.

Sludges were formerly land fanned, but there is currently a regulatory ban on the methodology because of frequent overloading of the system and failures to till sludges correctly, causing severe groundwater contamination.

Tertiary treatment of cooling waters from power plants is primarily for removal of metals by settling—ending up with heavy metal accumulation in pond/lake bottoms. Residuals from petrochemical, pesticides, and other refined hazardous materials processing are usually drummed and hauled to hazardous waste landfills or incinerated on site. Process water is frequently contaminated and requires remediation. Sludges from wastewater treatment ponds also require treatment.

Soils contaminated by advertent or inadvertent release of contaminants from distribution or "retail" facilities require treatment. The current treatments include incineration, land filling or bioremediation with micro organisms. Product pipelines (oil, petrochemical) gasoline stations, vehicle repair shops, petroleum storage or transport facilities including tanks, and tank tracks as well as clandestine dumping operations, are all frequent sources of oily soil contamination. Conventional remediation options include onsite bioremediation, land filling and incineration.

Agroremediation has heretofore met with limited success. The ability of certain plants to take up and remove contaminates from the soil is well documented. However, prior applications of plants suffered from use of annual crops, and the relatively low tolerance of many plants for certain contaminates. These shortcomings have been overcome by the present invention.

SUMMARY OF THE INVENTION

The present invention provides a method for reducing soil contamination that comprises: establishing growing perennial plants in the contaminated soil, the plants being selected from the group consisting of Hibiscus species in sections Meunchhusia or Striati or hybrids of one or more species within the sections; and severing and removing plant material from the site. Hybrids are especially preferred. The term Hibiscus as used below should be understood to be restricted to species or hybrids of species in sections Meunchhusia or Striati.

Three major types of bioremediation suitable for agricultural use of Hibiscus species are:

1) Bioremediation of agricultural soils that have been compromised by salt and trace element contaminated irrigation water. Excess salts and trace elements would be "mined" from the irrigation water used to maintain the fields, as well as from the contaminated soils, and incorporated into the growing plants.

2) Bioremediation of waste water effluent from power plants, petrochemical facilities and mining operations by uptake and incorporation of inorganic elements into the plants operated as a tertiary treatment "wetland", with appropriate species and levels of inundation.

3) Bioremediation of oily-waste contaminated sludges and soils by surface application of such wastes in the form of mulches, laid down between rows of planted Hibiscus. Such sludges would probably need to be mixed with suitable levels of compostable waste wood or agricultural byproducts (e.g., wheat straw, sugar cane bagasse, saw dust, Hibiscus core material, etc.) prior to transport and field application. Some sludges (e.g., pesticide or hazardous organic wastes) are also treated with appropriate microbes selected and adapted to breakdown the specific classes of organics, as necessary to maximize the rate of biodegradation of such materials in the "mulch". Organic contaminants would be degraded by microbes and other soil organisms, producing in-place fertilizers for the crop. As for the first two applications, any salts, metals or other trace elements would be sequestered in the growing plants.

Potential uses for the crop(s) from these agricultural bioremediation "treatment facilities" could be used for any products where the incorporated salts or metals would not result in any risk to end users. Applications may include paper, cardboard, fiberboard, plastics, animal bedding, packing material, and absorbents for oily wastes or other hazardous liquid spills.

DETAILED DESCRIPTION OF THE INVENTION

Hibiscus plants in sections Menchhusia or Striati and hybrids derived from crosses within the these sections have been found to take up salts and other contaminates such as boron and selenium with greater efficiency that the standard plant for evaluation of salt up take, the "salt bush" *Atriplex canescens*. The Hibiscus plants tolerate high levels of salt contamination as well as the presence of other trace elements. A highly effective remediation of contaminated soils can be achieved by growing Hibiscus, while in some cases also obtaining plant materials useful for applications such as animal litters, paper fiber, and, for some elements that are micro nutrients, animal feeds.

The preferred perennial plants are selected from the group consisting of *H. coccineus, H. cubensis, H. dasycalyx, H. laevis,* and *H. moscheutos*. Especially preferred plants comprise a hybrid from a cross of *H. coccineus*, a hybrid from a cross of *H. laevis*, or a hybrid from a cross of *H. moscheutos*. More especially preferred hybrids are crosses among *H. laevis, H. coccineus* and *H. moscheutos*, and crosses of the foregoing with Hibiscus X "Southern Belle."

The plants are grown in fields wherein the irrigation water, the soil or the ground water is contaminated with one or more metals, metal salts, organic wastes or nonmetals such as boron, selenium, and the like. Plants are selected to tolerate the contaminate in the soil or water, and to take up the contaminate while growing in the field. Preferably the plant material will incorporate the contaminate into its tissues, but acceptable results may also be obtained with materials that are merely transported to the plant surface areas. The plant in cooperation with microbial action may use organic wastes as a carbon source or may simply take the contaminate up as for example, concentrating sodium, selenium or boron in the plant tissue. Contaminates are removed from the field by harvesting and removing plant materials.

In some circumstances the harvested plant material must be handled as a waste product and disposed of in a conventional manner. Here the benefit is the relatively low energy costs of harvesting the plant material compared to recovering leachates or pumping ground water.

In many instances a second benefit is obtained because the plant materials may be safely used for a variety of finished products. For example plains that have sequestered boron or selenium may be used as feed supplement to supply these trace elements to cattle or other livestock. Plant material which has taken up sodium chloride or calcium chloride may still be used in paper making, resin production, or as a cattle feed supplement. In general plants may often he used to reduce the salinity of soil and the plant material find application as a source of animal bedding material, paper stock, and the like. Even if the nature of the contaminate is such that incineration is required for safe disposal of the plant material, the plant matter can is much more easily burned than the soil itself, and with far less residual material. The following specific examples illustrate the previously unrecognized ability of certain Hibiscus species to take up both metal salts and non metals. The illustrative metal ions, sodium and calcium are typical of mono and divalent metal ions. It is expected that similar results are obtained with any mono or divalent metal ions which may be present as soil contaminates.

Organic wastes which may also be present will be broken down by microbial action to materials that may be taken up as a carbon source by the growing plants. As the examples below illustrate, the materials to be taken up may be present in the soil, as with the boron and selenium in the examples, or present in the irrigation water as with the sodium, calcium and chloride examples. The examples also illustrate that different parts of the plant will contain different concentrations of material, allowing for selective handling of plant materials.

While the examples illustrate seed germination, one may preferably plant rooted cuttings or liners or "cane in" the plants as cuttings to be rooted in the soil. Such techniques may reduce the necessity to till contaminated areas, reducing worker exposure to site contaminates. Hibiscus seeds may also be broadcast on the field or supplied floated on irrigation flooding to approximate natural seeding events. Plants may produce flowers, seed pods, and harvested foliage while the root stock is maintained in place for next season's growth. With certain selected hybrids, plants may be a source of ornamentals as cuttings or liners, all the while reducing soil salinity on the growing plot.

EXAMPLE 1

*H. coccineus* var. "Lowery" plants were germinated in soil, irrigated with fresh water until the seedlings were established. The irrigation water was then changed to 10dS/m (as NaCl, $CaCl_2$, and $Na_2SO_4$). The plant material was collected and analyzed for Ca, Na and Cl in leaf, stem and root after 8 weeks growth. The results were Root, 3360 mg/kg Ca, 13440 mg/kg Na and 10260 mg/kg Cl; Stem 9300 mg/kg Ca, 46680 mg/kg Na, 20160 mg/kg Cl; and Leaf 31800 mg/kg Ca, 116160 mg/kg Na and 94680 mg/kg Cl. Under similar conditions *Atriplex canescens* had Stem levels of 7600 mg/kg Ca, 1300 mg/kg Na and 18180 mg/kg Cl and Leaf concentrations of 40100 mg/kg Ca, 5500 mg/kg Na and 54500 mg/kg Cl.

EXAMPLE 2

*H. coccineus* var. "Lowery" seeds planted 10 seed per pot were germinated in 20 dS/m soil salinity with 10 ppb soil boron as $H_3BO_3$ and 2 ppm selenium as $Na_2SeO_4$ and irrigated through out the trial with 2 dS/m water. Plants were harvested after eight weeks and elemental analysis performed: Root 43 mg/kg B, 1.812 mg/kg Se; Stem 33 mg/kg B and 13.02 mg/kg Se and Leaf 198 mg/kg B and 6.72 mg/kg Se.

EXAMPLE 3

*H. cubensis* var. "Guadalupe" (most recently designated taxonomically as *H. Striatus spp. lambertianus*) plants were germinated in soil, irrigated with fresh water until the seedlings were established. The irrigation water was then changed to 10dS/m (as NaCl, $CaCl_2$, and $Na_2SO_4$). The plant material was collected and analyzed for Ca, Na and Cl in leaf, stem and root after 8 weeks growth. The results were Root, 5940 mg/kg Ca, 30600 mg/kg Na and 13740 mg/kg Cl; Stem 16900 mg/kg Ca, 81540 mg/kg Na, 50400 mg/kg Cl; and Leaf 30480 mg/kg Ca, 49260 mg/kg Na and 43440 mg/kg Cl. Under similar conditions *Atriplex canescens* had Stem levels of 7600 mg/kg Ca, 1300 mg/kg Na and 18180 mg/kg Cl and Leaf concentrations of 40100 mg/kg Ca, 5500 mg/kg Na and 54500 mg/kg Cl.

EXAMPLE 4

*H. cubensis* var. "Guadalupe" (most recently designated taxonomically as *H. Striatus spp. lambertianus*) seeds planted 10 seed per pot were germinated in 20 dS/m soil salinity with 10 ppb soil boron as $H_3BO_3$ and 2 ppm selenium as $Na_2SeO_4$ and irrigated through out the trial with 2 dS/m water. Plants were harversted after 8 weeks and elemental analysis performed: Root 58 mg/kg B, 1.386 mg/kg Se; Stem 47 mg/kg B and 21.90 mg/kg Se and Leaf 823 mg/kg B and 12.90 mg/kg Se.

EXAMPLE 5

*H. dasycalyx* var. "Magnolia/Hempstead" plants were germinated in soil, irrigated with fresh water until the seedlings were established. The irrigation water was then changed to 10dS/m (as NaCl, $CaCl_2$, and $Na_2SO_4$). The plant material was collected and analyzed for Ca, Na and Cl in leaf, stem and root after 8 weeks growth. The results were Root, 6180 mg/kg Ca, 30120 mg/kg Na and 9840 mg/kg Cl; Stem 8460 mg/kg Ca, 29640 mg/kg Na, 10200 mg/kg Cl; and Leaf 30660 mg/kg Ca, 42660 mg/kg Na and 13740 mg/kg Cl. Under similar conditions *Atriplex canescens* had Stem levels of 7600 mg/kg Ca, 1300 mg/kg Na and 18180 mg/kg Cl and Leaf concentrations of 40100 mg/kg Ca, 5500 mg/kg Na and 54500 mg/kg Cl.

EXAMPLE 6

*H. laevis* var. "Guadalupe" seeds planted 10 seed per pot were germinated in 20 dS/m soil salinity with 10 ppb soil boron as $H_3BO_3$ and 2 ppm selenium as $Na_2SeO_4$ and irrigated through out the trial with 2 dS/m water. Plants were harversted after 8 weeks and elemental analysis performed: Root 72 mg/kg B, 2.028 mg/kg Se; Stem 57 mg/kg B and 25.20 mg/kg Se and Leaf 1126 mg/kg B and 19.72 mg/kg Se.

EXAMPLE 7

*H. Laevis* var. "Houston" seeds planted 10 seed per pot were germinated in 20 dS/m soil salinity with 10 ppb soil boron as $H_3BO_3$ and 2 ppm selenium as $Na_2SeO_4$ and irrigated through out the trial with 2 dS/m water. Plants were harversted after 8 weeks and elemental analysis performed: Root 46 mg/kg B, 0.738 mg/kg Se; Stem 14 mg/kg B and 11.34 mg/kg Se and Leaf 428 mg/kg B and 10.32 mg/kg Se.

EXAMPLE 8

*H. moscheutos* var. "Anahuac" plants were germinated in soil, irrigated with fresh water until the seedlings were established. The irrigation water was then changed to 10dS/m (as NaCl, $CaCl_2$, and $Na_2SO_4$). The plant material was collected and analyzed for Ca, Na and Cl in leaf, stem and root after 8 weeks growth. The results were Root, 3720 mg/kg Ca, 12180 mg/kg Na and 4920 mg/kg Cl; Stem 10560 mg/kg Ca, 42040 mg/kg Na, 14580 mg/kg Cl; and Leaf 17940 mg/kg Ca, 25680 mg/kg Na and 22320 mg/kg Cl. Under similar conditions *Atriplex canescens* had Stem levels of 7600 mg/kg Ca, 1300 mg/kg Na and 18180 mg/kg Cl and Leaf concentrations of 40100 mg/kg CA 5500 mg/kg Na and 54500 mg/kg Cl.

EXAMPLE 9

*H. mosheutos* var. "Lowery's Pink" plants were germinated in soil, irrigated with fresh water until the seedlings were established. The irrigation water was then changed to 10dS/m (as NaCl, $CaCl_2$, and $Na_2SO_4$). The plant material was collected and analyzed for Ca, Na and Cl in leaf, stem and root after 8 weeks growth. The results were Root, 2880 mg/kg Ca, 10260 mg/kg Na and 4740 mg/kg Cl; Stem 8460 mg/kg Ca, 41160 mg/kg Na, 12420 mg/kg Cl; and Leaf 16080 mg/kg Ca, 19260 mg/kg Na and 21660 mg/kg Cl. Under similar conditions *Atriplex canescens* had Stem levels of 7600 mg/kg Ca, 1300 mg/kg Na and 18180 mg/kg Cl and Leaf concentrations of 40100 mg/kg Ca, 5500 mg/kg Na and 54500 mg/kg Cl.

The preceding discussion and examples are provided to illustrate the invention and not to limit the scope of the invention disclosed herein. Many variations and uses will be apparent to those skillied in the art of soil remediation and agriculture, without reducing the scope of the claims set out below or departing from the spirit of the invention.

I claim:

1. A method for reducing soil calcium, selenium, boron, sodium, or chlorine content that comprises: establishing growing perennial plants in soil containing one or more substances selected from the group consisting of: calcium, selenium, boron, sodium, chlorine, and compounds of any of the preceding elements, the plants being selected from the group consisting of Hibiscus species in sections Meunchhusia or Striati or hybrids obtained by a cross with one or more species within sections Meunchhusia or Striati; severing and removing hibiscus plant material from the site.

2. A method according to claim 1 wherein the selected plants are hybrids.

3. A method according to claim 1 wherein the selected plants are selected from the group consisting of *H. coccineus, H. cubensis, H. dasycalyx, H. laevis,* and *H. moscheutos*.

4. A method according to claim 1 wherein the selected plants comprise *H. coccineus*.

5. A method according to claim 1 wherein the selected plants comprise *H. cubensis*.

6. A method according to claim 1 wherein the selected plants comprise *H. dasycalyx*.

7. A method according to claim 1 wherein the selected plants comprise *H. mosheutos*.

8. A method according to claim 1 wherein the selected plants comprise hybrids from a cross of *H. coccineus*.

9. A method according to claim 1 wherein the selected plants comprise hybrids from a cross of *H. laevis*.

10. A method according to claim 1 wherein the selected plants comprise hybrids from a cross of *H. moscheutos*.

11. A method according to claim 1 wherein the selected plants comprise hybrids from a cross of one of *H. moscheutos, H. laevis,* or *H. coccineus* with Hibiscus X "Southern Belle."

* * * * *